United States Patent Office 3,558,692
Patented Jan. 26, 1971

3,558,692
PRODUCTION OF VINYL ACETATE FROM ETHYLENE
Harry B. Copelin, Niagara Falls, and Melvin J. Freamo, North Tonawanda, N.Y., assignors to E. I. du Pont de Nemours and Company, Wilmington, Del., a corporation of Delaware
No Drawing. Filed Feb. 17, 1964, Ser. No. 345,064
Int. Cl. C07c 67/04
U.S. Cl. 260—497         7 Claims

ABSTRACT OF THE DISCLOSURE

A cyclic two-stage method of preparing vinyl acetate which comprises reacting in a first stage ethylene with a working solution which in its oxidized state is an acetate acid solution including a cupric salt, a palladium II salt and chloride or bromide ions within certain critical concentration limits and contacting in a second stage the reduced working solution from the first stage with oxygen in a reaction zone wherein back-mixing of the working solution is effected.

---

This invention relates to the prodution of vinyl acetate from ethylene and particularly to a method for carrying out such production at high rates.

The first published account of the synthesis of vinyl acetate by the reaction of ethylene with an acetic acid solution of a palladium II salt and an ionizable acetate appears to be that of Moiseev et al., Doklady Akad. Nauk SSSR. 133, 377 (1960). The acetic acid reaction medium preferably also contains an oxidizing agent such as a quinone or a cupric salt, the purpose of which is to maintain the palladium salt in its +2 valence state. A similar preparation of vinyl acetate is disclosed in British Pat. 928,739 and Belgian Pat. 618,071.

The oxidizing agent in the reaction medium becomes reduced during use and may be reoxidized for further use by means of oxygen supplied with the ethylene to the reaction medium (hereinafter generally referred to as the "working solution"), or such reoxidation or regeneration of the oxidizing agent may be effected in a separate operation as disclosed in Belgian Pats. 608,610 and 614,970, and in French Pat. 1,318,208.

The procedures described in the above references produce vinyl acetate at rates much too low to be attractive commercially. Thus in the many examples of the patents, the production rates shown range from only about 4 to 75 lbs. of vinyl acetate/24 hr. day/cu. ft. of working solution while the production rates in terms of grams of vinyl acetate/hr./gram of palladium II salt in the working solution range from only about 0.2 to 18. Such low production rates increase costs due to the high equipment investment and the high inventory of expensive palladium required for a given vinyl acetate production.

It is an object of the invention to provide improvements in the method of producing vinyl acetate from ethylene whereby vinyl acetate can be obtained at high, commercially attractive rates. A further object is to provide an improved method for reacting ethylene with an acetic acid working solution of a palladium II salt, an ionizable metal acetate, an oxidizing agent and a minor amount of water, whereby vinyl acetate and acetaldehyde can be obtained at very high rates per unit volume of working solution and per unit weight of palladium salt in the working solution. Another object is to provide such a highly productive method which avoids the hazards of mixing ethylene and oxygen. Still further objects will be apparent from the following description.

The objects of the invention are achieved by a cyclic process in which a working solution which, in its oxidized state, is an acetic acid solution of a palladium II salt, an ionizable metal acetate, a cupric salt oxidizing agent and a dissolved metal chloride or bromide providing a halide ion concentration of from about 0.05 to 0.85 molar, is continuously cycled between a first stage and a second reaction stage of the process wherein: (a) ethylene is continuously contacted and reacted with the working solution in the first reaction stage at a temperature of 50 to 160° C. and an ethylene pressure of 50 to 2000 p.s.i.g., whereby vinyl acetate is produced and the working solution becomes at least partially reduced; (b) the vinyl acetate product is stripped from the reduced working solution; (c) the reduced working solution is then continuously contacted and reacted with oxygen in the second reaction stage in a back-mixing reactor at a temperature of 50 to 150° C., whereby it is reoxidized; and (d) the reoxidized working solution is recycled to the first stage.

The reaction of ethylene and the ionizable metal acetate to produce vinyl acetate in the first reaction stage of the cycle is catalyzed by the palladium II salt, probably through the intermediate formation of an ethylene-palladium II salt complex such as $(C_2H_4 \cdot PdCl_2)_2$. When the ionizable metal acetate is cupric acetate, which would also function as the oxidizing agent, the reaction in the first reaction stage may be represented by the following equation in which "Ac" stands for the

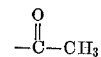

radical:

(A)  $C_2H_4 + 2Cu(OAc)_2 \rightarrow CH_2$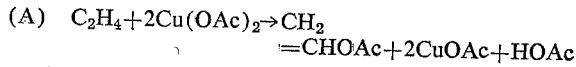
$=CHOAc + 2CuOAc + HOAc$

The regeneration or oxidation reaction occurring in the second reaction stage of the cycle by which the cuprous acetate product of reaction A is reoxidized to cupric acetate for reuse is as follows:

(B)  $2CuOAc + 2HOAc + \tfrac{1}{2}O_2 \rightarrow 2Cu(OAc)_2 + H_2O$

The net or over-all reaction is:

(C)  $C_2H_4 + HOAc + \tfrac{1}{2}O_2 \rightarrow CH_2=CHOAc + H_2O$ from which it will be seen that one mole of acetic acid is consumed and one mole of water is formed for each mole of vinyl acetate produced.

Some by-products, notably acetaldehyde, are formed along with the vinyl acetate in the first reaction stage but the amount thereof will be small if the time of contact of the vinyl acetate with the working solution is kept short and the water content of the working solution is kept as low as possible. Since the palladium II salt actively catalyzes the hydrolysis of vinyl acetate to acetaldehyde and acetic acid, the water content of the working solution will largely control the amount of acetaldehyde by-product. Whereas the formation of acetaldehyde along with the vinyl acetate has heretofore been regarded as undesirable, its formation can actually be beneficial in that it can be oxidized to acetic acid in the working solution in the second reaction stage according to the method of the Copelin application, Ser. No. 345,507, filed Feb. 17, 1964. Thus, by controlling the amount of by-product acetaldehyde produced and converting it to acetic acid by the method of the above application, the process can be operated so that cheap ethylene serves as the raw material for both the vinyl acetate and the required acetic acid, whereby the over-all process can be made self-sufficient with respect to acetic acid. When so operated, the vinyl acetate synthesis may be represented by the over-all reaction:

(D)  $2C_2H_4 + \tfrac{3}{2}O_3 \rightarrow CH_2=CHOAc + H_2O$

Among the various features of the method of the invention which make possible its high productivity, i.e., a space time yield of at least 100 lb. vinyl acetate/day/cu. ft. of working solution, are the temperature and pressure conditions employed in each of the two reaction stages, the use of efficient agitation including the use of a reactor for the second reaction stage provided with means for effecting efficient back-mixing of the working solution therein, and the use of a working solution having a composition as indicated which includes a cupric salt as the oxidizing agent and contains chloride or bromide ions within certain concentration limits.

The first stage reaction can be carried out in a single-stage back-mixing type reactor, a multi-stage back-mixing type reactor, a pipeline or tower type reactor, or in any type of reactor in which efficient contact between a gas and a liquid can be achieved. Agitation is highly desirable to maintain solids suspended and to facilitate solution of the ethylene. The use of a tower or a single-stage back-mixing reactor gives excellent results and these types are generally preferred. The reaction should be carried out at a temperature of at least 50° C., e.g., 50 to 160° C., and at an ethylene pressure of at least 50 p.s.i.g., e.g, 50 to 2000 p.s.i.g. At lower pressures and temperatures the space time yields are too low while higher temperatures and pressures result in no added advantages. The preferred temperatures range from 80 to 130° C. while the preferred ethylene pressures range from 100 to 500 p.s.i.g.

It is important that the oxidation or second stage reaction be carried out in a reactor which provides efficient back-mixing of the working solution therein, for reasons explained below. Again, agitation is desirable to keep solids in suspension and to provide good contact between the gaseous reactant and the working solution. A reactor provided with a well-known vaned disk type agitator to provide the desired agitation and the required back-mixing is quite suitable. The reaction should be effected at a temperature of at least 50° C., e.g., 50 to 150° C. or higher, to insure the desired reaction rate. The preferred temperatures range from 80 to 130° C. The oxidation can be carried out employing oxygen gas, but the use of air is preferred. Oxygen partial pressures of from 0.01 to 2 atmospheres are generally suitable and when using air, operation with the system under pressure so as to give oxygen partial pressures within the above range is desirable. Whether using oxygen gas, oxygen-enriched air, or air, the preferred oxygen partial pressures range from 0.1 to 1 atmosphere.

The working solution in its oxidized state, is an acetic acid solution of a palladium II salt, an ionizable metal acetate, a cupric salt oxidizing agent and a metal halide or bromide to provide halide ions at a concentration within the range indicated below. It may also contain a minor amount of water, but generally not more than 20% thereof, based upon the weight of the solvent components of the working solution. Unless it is particularly desired to increase by-product acetaldehyde formation for the co-production of acetic acid, for example, by the method of the above Copelin application Ser. No. 345,507, the water content generally will be maintained at not more than about 3%. If the co-production of vinyl acetate and acetic acid is desired, the water content will generally range from 3 to 15%, based upon the weight of the solvent components which most generally will consist essentially of acetic acid and water.

Suitable palladium II salts for use in the working solution are the chloride ($PdCl_2$), the bromide ($PdBr_2$) and the acetate ($Pd(OAc)_2$); and the alkali metal chloro- and bromopalladites, such as potassium chloropalladite ($K_2PdCl_4$) and lithium chloropalladite ($Li_2Pd_2Cl_4$). Use of the palladous halide, $PdCl_2$ or $PdBr_2$, in the form of an alkali metal halopalladite, e.g., $Li_2PdCl_4$ is generally preferred. The palladium II salt, the important part of which is the Pd II portion thereof, should be soluble in the working solution in an amount to provide a dissolved palladium II salt concentration of from 0.001 to 0.1 mole, or higher, preferably 0.003 to 0.03 mole per liter. The palladium II salt can be charged to the working solution as one of the salts indicated above; or palladium metal, its oxide or carbonate may be charged and dissolved in the working solution.

The ionizable metal acetate is preferably cupric acetate or an alkali metal acetate, although the acetates of the alkaline earth metals and magnesium can be used, as can also ferric, stannic, nickel and cobalt acetates. Such acetates can be charged as such or they can be formed by reaction of the oxides, hydroxides or carbonates of the indicated metals with the acetic acid component of the working solution. The metal acetate content of the working solution should be at least 0.01 molar, e.g., 0.01 to 1 molar p;referably it will be at least 0.1 molar, e.g., 0.1 to 0.5 molar. Concentrations exceeding the solubility of the metal acetate can be used. Metal acetate concentrations exceeding about 1 molar afford no particular added advantage, except when using cupric acetate, in which case, concentrations as high as 2.5 molar are advantageous for reasons explained below.

The most preferred metal acetate is cupric acetate, or a combination thereof with an alkali metal acetate. Cupric acetate will serve both as a source of acetate ions and as the oxidizing agent and its use at a concentration of 0.05 to 2.5, particularly 1.0 to 1.5 moles per liter, is preferred. At the higher of such concentrations, part of the cupric acetate will not dissolve and the initial mixture will be a slurry. However, as the reaction proceeds, the cupric acetate in solution is reduced to the cuprous salt and more of the cupric acetate dissolves. In the presence of the halide ion, the reduced cuprous ion will precipitate as the cuprous halide and, therefore, the working solution will generally be a slurry whose solid phase will be either cupric acetate, cuprous halide, or both.

The oxidizing agent of the working solution is a cupric salt such as the chloride, bromide or the acetate, the latter being preferred as indicated above. It will be charged to the working solution to provide a concentration therein of from 0.05 to 2.5, preferably 1 to 1.5, moles per liter. A high cupric salt content is desirable to provide a working solution of high synthesis capacity per cycle. As explained previously, the amount of cupric salt charged may exceed its solubility, but should not be so great as to result in a slurry which cannot be effectively agitated and transported, e.g., by pumping. While cupric chloride or bromide can be used, the amount thereof, if used should be restricted in keeping with the halide ion requirements explained below.

The halide (chloride or bromide) ion concentration of the working solution, both in the first and second reaction stages of the cyclic process, is of critical importance. The concentration of halide ion, i.e., dissolved $Cl^-$ or $Br^-$ but not precipitated halide such as precipitated cuprous chloride, should be at least 0.05 molar but not in excess of about 0.85 molar. At lower concentrations, productivity will be too low and conversions poor while higher concentrations, e.g., 0.9 molar or higher will generally result in excessive glycol derivatives and also reduce reaction rates. The preferred halide ion concentrations range from 0.2 to 0.6 molar. The halide ion requirements may be supplied as cupric chloride or bromide as indicated above, or as the metal chloride or bromide of any of the other metals whose acetates have been indicated above. The preferred sources are the alkali metal and magnesium chlorides and bromides, particularly lithium and magnesium chlorides, especially when high acetate concentrations supplied as cupric acetate are to be used, as is preferred. As indicated previously, halides such as cuprous chloride, present in undissolved form in the working solution slurry are inert in the first stage reaction and should not be considered in calculating the halide ion concentration.

The reduced working solution stream from the first stage reactor will generally be degassed to free it of unreacted ethylene (which may be recycled) and then fed to a stripping column where any lights (including acetaldehyde), vinyl acetate, excess water and some acetic acid pass overhead and the stripped working solution runs down the column and is passed to the oxidizer or second stage reactor. Acetaldehyde recovered from the overhead can, if desired, be fed along with the stripped working solution to the oxidizer and there oxidized to acetic acid in accordance with the method of Copelin application Ser. No. 345,507.

When using a working solution of preferred composition, the reduced stripped solution effluent from the first stage reactor will normally have all of its chloride content present as precipitated cuprous chloride. This together with the fact that the oxidation of the cuprous chloride is autocatalytic explains the importance of employing an oxidizer provided with means for effecting efficient backmixing of the working solution therein. The oxidation of cuprous acetate, which is soluble, presents no problem because such oxidation occurs rapidly. On the other hand cuprous chloride is insoluble, hence, contact thereof with oxygen is poor and the oxidation slow. However, cuprous chloride is solubilized by chloride ion, so that as the oxidation progresses with the cuprous chloride being converted to soluble cupric chloride, the chloride ion concentration increases and the oxidation rate accelerates rapidly. To obtain peak rates, the oxidizer working solution should contain at least 0.2, e.g., 0.2 to 0.6 mole of chloride ions per liter. Chloride ion at such concentrations solubilizes sufficient cuprous chloride as $CuCl_2^-$ to assure high rates. Since working solution effluent from a continuous back-mixing oxidizer will be of a composition approximately that of the preferred composition for the working solution fed to the first stage reactor, the effluent from such an oxidizer can and preferably will be recycled directly to the first stage reactor.

The invention is illustrated by the following examples. In the examples and throughout the specification, all composition percentages are by weight.

EXAMPLE 1

A working solution charge was prepared by mixing the following compounds:

| Compound | Grams | Wt. percent | Moles liter |
|---|---|---|---|
| Glacial acetic acid | 2,500 | | |
| Cupric acetate monohydrate | 910 | 24.7 | 1.42 |
| Lithium chloride | 100.2 | 2.74 | 0.74 |
| Lithium acetate dihydrate | 162.6 | 4.41 | 0.50 |
| Palladous chloride | 6.46 | 0.175 | 0.0114 |
| Water | 10 | [1]4.05 | [1]3.0 |

[1] Total.

In formulating the working solution, the palladous chloride was dissolved in the 10 grams of water to which 5 g. of the lithium chloride has been added, and the resulting solution was then added to a mixture of the remaining materials. The weight percent of water in the above tabulation is based upon the total weight of the working solution; when based upon the combined weights of acetic acid and water, the water content is 5.6%.

The charge was agitated to obtain a uniform slurry whose solid phase was cupric acetate, which slurry was pumped continuously into a pressure reactor where it was contacted with ethylene at a pressure of 300 p.s.i.g. The reactor was of 80 cc. working capacity and was fitted with an agitator, an over-flow line and a temperature controller set for 90° C. After 30 minutes of operation, the reactor effluent was sampled. At a working solution hold-time in the reactor of 3.2 minutes, the conversion of cupric acetate to vinyl acetate was 53.4% while the conversion to vinyl acetate and acetaldehyde was 69.1%. The productivity for vinyl acetate was 900 lb./24 hr. day/cu. ft. of working solution in the reactor, or 300 grams/gram of $PdCl_2$/hr. The productivity for vinyl acetate and acetaldehyde was 1035 lbs./24 hr. day/cu. ft., or 345 grams/gram of $PdCl_2$/hr.

EXAMPLE 2

The reduced working solution from Example 1, was stripped of vinyl acetate and acetaldehyde and regenerated by a batch oxidation. This required 145 minutes at 90° C. corresponding to a vinyl acetate equivalent productivity of only 28 lb./day/cu. ft. of working solution. It was again pumped through the continuous reactor of Example 1, where it was contacted with ethylene at 300 p.s.i.g. and 87° C. After eight minutes at a solution hold-time of 2.7 minutes, the conversion level of the reactor effluent was 37% to vinyl acetate and 53% to vinyl acetate and acetaldehyde. The productivity was 770 lb. of vinyl acetate/day/cu. ft. of working solution in the reactor, and 288 grams/gram of $PdCl_2$/hr. The productivity for vinyl acetate and acetaldehyde was 941 lb./day/cu. ft., or 354 grams/gram of $PdCl_2$/hr.

EXAMPLE 3

A working solution charge was made up the same as in Example 1 except that only 1.62 g. of $PdCl_2$ was added, giving a $PdCl_2$ concentration of 0.44% by weight or 0.0285 moles per liter. After having been reduced and reoxidized twice, the charge was pumped through the reactor used in Examples 1 and 2, but at 108 to 112° C. and an ethylene pressure of 99 to 102 p.s.i.g. The following results were obtained:

| Sample time, min. | Hold time, min. | Percent conv. of $Cu^{++}$ to | | Productivity | | | |
|---|---|---|---|---|---|---|---|
| | | | | Lb./day/cu. ft. | | g./g. $PdCl_2$/hr. | |
| | | VAc | VAc+HAc | VAc | VAc+HAc | VAc | VAc+HAc |
| 15 | 7.3 | 35.9 | 45.0 | 266 | 300 | 380 | 428 |
| 30 | 7.8 | 36.2 | 46.0 | 254 | 287 | 338 | 385 |
| 45 | 6.1 | 37.8 | 45.1 | 335 | 368 | 442 | 485 |
| 75 | 8.7 | 33.8 | 38.1 | 209 | 223 | 276 | 294 |
| 90 | 6.8 | 42.7 | 49.2 | 340 | 366 | 450 | 485 |
| 105 | 9.3 | 40.9 | 47.8 | 240 | 261 | 316 | 343 |
| 120 | 9.3 | 38.0 | 43.9 | 221 | 238 | 290 | 313 |
| 165 | 6.8 | 39.7 | 47.0 | 294 | 321 | 415 | 454 |

As will be noted from the above data, increasing the hold-time does not necessarily increase conversion. The optimum hold-time for the conditions of this example appear to be about six minutes or somewhat less.

EXAMPLE 4

A working solution charge was prepared as in Example 1 using the following:

| Compound | Grams | Wt. percent | Moles/ liter |
|---|---|---|---|
| Glacial acetic acid | 2,500 | | |
| Cupric acetate monohydrate | 910 | 28.4 | 1.41 |
| Lithium chloride | 110.0 | 2.97 | 0.81 |
| Lithium acetate dihydrate | 170 | 4.60 | 0.52 |
| Palladous chloride | 1.85 | 0.05 | 0.00325 |
| Water | 10 | [1]4.1 | [1]2.62 |

[1] Total.

The water content shown is based upon the total weight of the charge; when based upon the combined contents of acetic acid and water it is 5.7%.

This charge was passed through the continuous reactor as in the previous examples except that the temperature was maintained at 124 to 125° C. and the ethylene pressure was 100 p.s.i.g. The results were:

| Sample time, min. | Hold time, min. | Percent conv. of $Cu^{++}$ to | | Productivity | | | |
|---|---|---|---|---|---|---|---|
| | | | | Lb./day/cu. ft. | | g./g. $PdCl_2$/hr. | |
| | | VAc | VAc+HAc | VAc | VAc+HAc | VAc | VAc+HAc |
| 15 | 3.0 | 39.7 | 59.8 | 656 | 824 | 800 | 1,005 |
| 30 | 4.5 | 45.0 | 65.2 | 508 | 624 | 625 | 768 |
| 45 | 4.3 | 50.3 | 64.9 | 592 | 680 | 708 | 813 |

EXAMPLE 5

The reduced working solution from Example 4 was stripped of vinyl acetate and acetaldehyde and batch oxidized until the chloride ion content of the supernatant liquid was 1.78% or 0.48 mole per liter. The remainder of the chloride was tied up as solid CuCl. This partially oxidized solution, which simulates product from a continuous back-mixing oxidizer, was then fed to the continuous reactor of Example 1 and there reacted at 122° C. with ethylene at an ethylene pressure of 100 p.s.i.g. The results were:

| Sample time, min. | Hold time, min. | Percent conv. of $Cu^{++}$ to | | Productivity | | | |
|---|---|---|---|---|---|---|---|
| | | | | Lb./day/cu. ft. | | g./g. $PdCl_2$/hr. | |
| | | VAc | VAc+HAc | VAc | VAc+HAc | VAc | VAc+HAc |
| 15 | 5 | 33.0 | 41.8 | 366 | 416 | 412 | 468 |
| 30 | 5 | 35.1 | 41.0 | 388 | 422 | 437 | 475 |

EXAMPLE 6

The reduced working solution from Example 5 was stripped of vinyl acetate and acetaldehyde and reoxidized until the chloride ion ($Cl^-$) content of the supernatant liquid was 1.26% or 0.32 mole per liter. This partially oxidized working solution was then fed to the continuous reactor of Example 1 and there reacted at 122° C. with ethylene at a pressure of 100 p.s.i.g. The results were:

| Sample time, min. | Hold time, min. | Percent conv. of $Cu^{++}$ to | | Productivity | | | |
|---|---|---|---|---|---|---|---|
| | | | | Lb./day/cu. ft. | | g./g. $PdCl_2$/hr. | |
| | | VAc | VAc+HAc | VAc | VAc+HAc | VAc | VAc+HAc |
| 15 | 2.6 | 21.8 | 35.5 | 516 | 562 | 530 | 477 |
| 30 | 5.2 | 23.6 | 36.0 | 249 | 272 | 290 | 317 |
| 55 | 3.8 | 19.0 | 21.8 | 290 | 311 | 320 | 344 |

EXAMPLE 7

This example shows the effect of oxidation level on oxidation rate in a synthetic working solution. A charge was prepared using the following:

| Compound | Grams | Wt. percent | Moles liter |
|---|---|---|---|
| Glacial acetic acid | 691 | | |
| Cupric acetate monohydrate | 134 | 13.3 | 0.775 |
| Lithium acetate dihydrate | 118 | 11.7 | 1.35 |
| Cuprous chloride (insoluble) | 70 | 6.9 | 0.816 |

The over-all oxidation level of the mixture was 49%, that is, 49% of the copper was present as the cupric form and 51% as the cuprous form. The mixture was charged to a reactor having an efficient agitator and a gas-inlet line and heated to 107° C., then oxygen was blown in. The following data show the correlation between the oxidation level (percent Cu present as $Cu^{++}$) and the rate of oxidation (lb. VAc equivalent/day/cu. ft.):

| Cu as $Cu^{++}$, percent | Moles liter, chloride ion | Rate in lb. VAc eq./ day/cu. ft. |
|---|---|---|
| 49 | 0.01 | 50 |
| 55 | 0.05 | 145 |
| 70 | 0.17 | 240 |
| 80 | 0.25 | 342 |
| 90 | 0.34 | 255 |

EXAMPLE 8

This example shows the improvement gained by effecting the oxidation continuously in a back-mixing reactor.

The oxidation reactor consisted of a 500 ml. resin kettle fitted with a vaned disk agitator to provide efficient back-mixing, a gas-inlet tube, baffles, thermometer, and provision for working solution feed and overflow. The reactor capacity with the agitator turning was 437 cc.

A working solution charge was prepared using the following:

| Compound | Grams | Wt. percent | Moles/ liter |
|---|---|---|---|
| Acetic acid | 2,500 | | |
| Cupric acetate monohydrate | 910 | 26.0 | 1.47 |
| Lithium chloride | 51 | 1.45 | 0.40 |
| Lithium acetate dihydrate | 35 | 1.0 | 0.11 |
| $Li_2PdCl_4$ | 5.2 | 0.15 | 0.006 |
| Water | | [1] 2.7 | |

[1] Total.

The 2.7% water is based upon the total charge. The water content based upon the acetic acid and water contents was 3.6%. This charge was reacted with ethylene to yield a partly reduced working solution in which the ratio of $Cu^+$ to $Cu^{++}$ was 67/3, i.e., the copper was 63% in the reduced form. Vinyl acetate and acetaldehyde were stripped off and makeup acetic acid was added to compensate for that removed physically from the still and that converted to vinyl acetate. An additional 57 g. of LiCl was added to bring the total LiCl concentration to 3%.

The above partially reduced working solution was fed continuously at an average rate of 39 g./min. to the above oxidation reactor which had been previously charged with a corresponding but completely oxidized working solution made up from the following:

| Compound | Grams | Wt. percent | Moles liter |
|---|---|---|---|
| Acetic acid | 357 | | |
| Cupric acetate monohydrate | 130 | 26.0 | 1.16 |
| Lithium chloride | 15.4 | 3.03 | 0.74 |
| Lithium acetate dihydrate | 5 | 1.0 | 0.11 |
| $Li_2PdCl_4$ | 0.74 | 0.15 | 0.008 |
| Water | | [1] 2.7 | |

[1] Total.

The reactor temperature was maintained at 95 to 100° C. and the rate of $O_2$ throughout was maintained at 1500 cc./min. (S.T.P.). The working solution effluent from the reactor was analyzed periodically to determine the proportion of the total copper which was present in the cupric form. The results were:

| Time, min.: | Copper in cupric form, percent |
|---|---|
| 0 | 100 |
| 10 | 83 |
| 20 | 71 |
| 30 | 85 |
| 40 | 86 |
| 50 | 80 |
| 57 (end of run) | 89 |

The average hold-time for the solution in the reactor was 12.8 minutes, the total weight of reduced working solution fed was 2226 g. and the conversion of cuprous copper fed to cupric copper was 76%. The displacement of the initial reactor charge was calculated to be 98% and the productivity calculated as vinyl acetate equivalent was 220 lb./day/cu. ft. This value is far superior to the productivity of 28 lb./day/cu. ft. obtained in the batch oxidation of Example 2 without efficient back-mixing. When the above continuous oxidation is carried out under the same conditions but at twice the oxygen partial pressure, the productivity is increased from 220 to about 440. Further increases in the oxygen partial pressure result in proportionately greater productivities.

The embodiments of the invention in which an exclusive property or privilege is claimed are as follows:

1. A cyclic method of producing vinyl acetate from ethylene comprising:
   (a) providing a working solution which, in its oxidized state, is an acetic acid solution of palladium II salt, an ionizable metal acetate, a cupric salt and a metal halide providing halide ions from the group consisting of chloride and bromide ions at a concentration of from 0.05 to 0.85 molar, which solution contains not more than 20% by weight of water based upon its solvent content;
   (b) cycling said working solution continuously between a first reaction stage and a second reaction stage;
   (c) continuously contacting and reacting ethylene with said working solution in said first reaction stage at a temperature of 50 to 160° C. and an ethylene pressure of 50 to 2000 p.s.i.g., whereby vinyl acetate is produced and the working solution becomes at least partially reduced with precipitation of cuprous halide;
   (d) continuously stripping vinyl acetate as product from the reduced working solution;
   (e) continuously contacting and reacting the stripped reduced working solution with oxygen at 50 to 150° C. in said second reaction stage in a reaction zone wherein back-mixing of the working solution is effected, whereby said working solution is reoxidized; and
   (f) recycling the reoxidized working solution to said first reaction stage.

2. The method of claim 1 wherein the working solution in its oxidized state is an acetic acid solution of a palladium II salt at a concentration of 0.001 to 0.1 molar, an ionizable metal acetate at a concentration of at least 0.01 molar, a cupric salt at a concentration of from 0.05 to 2.5 molar.

3. The method of claim 1 wherein the working solution in its oxidized state is an acetic acid solution of a palladium II salt at a concentration of 0.003 to 0.3 molar, cupric acetate at a concentration of 0.05 to 2.5 molar and lithium chloride at a concentration of 0.05 to 0.85 molar, said solution containing 3 to 15% by weight of water based upon the solvent content of said solution.

4. The method of claim 1 wherein the working solution in its oxidized state is an acetic acid solution of a palladium II salt at a concentration of 0.003 to 0.03 molar, cupric acetate at a concentration of 1 to 1.5 molar and a metal chloride providing a chloride ion concentration of 0.2 to 0.6 molar.

5. The method of claim 1 wherein the working solution in its oxidized state is an acetic acid solution of a palladium II salt at a concentration of 0.001 to 0.1 molar, cupric acetate at a concentration of 1 to 1.5 molar and a metal chloride providing a chloride ion concentration of 0.2 to 0.6 molar; and wherein said working solution in the second reaction stage and as it is recycled to the first reaction stage contains chloride ions at a concentration of 0.2 to 0.6 molar, which chloride ions are precipitated as cuprous chloride by said first stage reaction whereby said working solution is substantially free of said chloride ions as it leaves said first stage reaction and as it is recycled to said second stage reaction.

6. A cyclic method of producing vinyl acetate from ethylene comprising:
   (a) providing a working solution which, in its oxidized state, is an acetic acid solution of palladous chloride at a concentration of 0.003 to 0.03 molar, cupric acetate at a concentration of 1 to 1.5 molar and lithium chloride providing chloride ions at a concentration of 0.2 to 0.6 molar, which solution contains not more than 20% by weight of water, based upon the solvent content of said solution;
   (b) cycling said working solution continuously between a first reaction stage and a second reaction stage;
   (c) continuously contacting and reacting ethylene with said working solution in said first reaction stage at a temperature of 80 to 130° C. and an ethylene pressure of 100 to 500 p.s.i.g., whereby vinyl acetate is produced and the working solution becomes at least partially reduced and substantially all of the chloride ions have been precipitated as cuprous chloride;
   (d) continuously stripping vinyl acetate as product from the reduced working solution;
   (e) continuously contacting the stripped reduced working solution with oxygen at 80 to 130° C. and an oxygen partial pressure of from 0.01 to 2 atmospheres in said second reaction stage in a reaction zone wherein backmixing of the working solution is effected, whereby said working solution is reoxidized and the chloride ion concentration of the working solution during said second stage reaction is maintained at 0.2 to 0.6 molar; and
   (f) recycling the reoxidized working solution to said first reaction stage.

7. The method of claim 6 wherein the second stage reaction is carried out at an oxygen partial pressure of 0.1 to 1 atmosphere.

References Cited

UNITED STATES PATENTS

| 3,260,739 | 7/1966 | Schaeffer | 260—497 |
| 3,288,845 | 11/1966 | Schaeffer | 260—497 |

FOREIGN PATENTS

| 145,569 | 5/1962 | U.S.S.R. | 260—497 |
| 608,610 | 3/1962 | Belgium | 260—497 |
| 614,970 | 9/1962 | Belgium | 260—497 |

LORRAINE A. WEINBERGER, Primary Examiner

V. GARNER, Assistant Examiner

U.S. Cl. X.R.

252—416; 260—530, 533, 541, 601, 604

PO-1050
(5/69)

UNITED STATES PATENT OFFICE
CERTIFICATE OF CORRECTION

Patent No. 3,558,692　　　　　　Dated January 26, 1971

Inventor(s) Harry B. Copelin and Melvin J. Freamo

It is certified that error appears in the above-identified patent and that said Letters Patent are hereby corrected as shown below:

In column 9, line 69, change "0.3" to -- 0.03 --.

Signed and sealed this 18th day of May 1971.

(SEAL)
Attest:

EDWARD M. FLETCHER, JR.　　　　　　WILLIAM E. SCHUYLER, JR
Attesting Officer　　　　　　　　　　Commissioner of Patents